United States Patent
Choi et al.

(10) Patent No.: US 9,352,690 B2
(45) Date of Patent: May 31, 2016

(54) APPARATUS AND METHOD FOR DETECTING OBSTACLE ADAPTIVELY TO VEHICLE SPEED

(71) Applicant: Electronics and Telecommunications Research Institute, Daejeon (KR)

(72) Inventors: Hyun-Kyun Choi, Daejeon (KR); Kyung-Bok Sung, Daejeon (KR); Dong-Yong Kwak, Daejeon (KR); Dong-Sun Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 213 days.

(21) Appl. No.: 14/059,607

(22) Filed: Oct. 22, 2013

(65) Prior Publication Data

US 2014/0214271 A1 Jul. 31, 2014

(30) Foreign Application Priority Data

Jan. 31, 2013 (KR) .......................... 10-2013-0011459

(51) Int. Cl.
*B60R 1/00* (2006.01)
*B60W 30/095* (2012.01)
*B60W 50/00* (2006.01)

(52) U.S. Cl.
CPC .............. *B60R 1/002* (2013.01); *B60W 30/095* (2013.01); *B60W 2050/0075* (2013.01); *B60W 2420/42* (2013.01); *B60W 2420/62* (2013.01); *B60W 2520/10* (2013.01); *B60W 2550/402* (2013.01)

(58) Field of Classification Search
CPC ........ G01S 17/89; G01S 17/93; G01S 17/023
See application file for complete search history.

(56) References Cited

U.S. PATENT DOCUMENTS

| | | | |
|---|---|---|---|
| 2004/0150515 A1* | 8/2004 | Kallhammer et al. | 340/441 |
| 2004/0167709 A1* | 8/2004 | Smitherman et al. | 701/208 |
| 2010/0328644 A1* | 12/2010 | Lu et al. | 356/5.01 |
| 2012/0163671 A1 | 6/2012 | Choi et al. | |
| 2012/0218564 A1* | 8/2012 | W stefeld et al. | 356/614 |

FOREIGN PATENT DOCUMENTS

| | | |
|---|---|---|
| KR | 10-2011-0027522 | 3/2011 |
| KR | 10-2012-0057458 | 6/2012 |
| KR | 10-2012-0072131 | 7/2012 |

* cited by examiner

*Primary Examiner* — John R Olszewski
*Assistant Examiner* — Jason Roberson
(74) *Attorney, Agent, or Firm* — Nelson Mullins Riley & Scarborough LLP; Anthony A. Laurentano

(57) ABSTRACT

Disclosed herein are an apparatus and method for detecting an obstacle adaptively to vehicle speed. The apparatus includes a control unit, a speed-adaptive camera sensor, a speed-adaptive laser scanner sensor, and a detection data integration unit. The control unit receives information about the speed of a vehicle and a Pulse Per Second (PPS) signal from a Global Positioning System (GPS) module. The speed-adaptive camera sensor adjusts the range of a detection region based on the information about the speed of the vehicle, and generates first detection data on an object. The speed-adaptive laser scanner sensor adjusts the range of the angle of the field of view of a laser scanner based on the information about the speed of the vehicle, and generates second detection data on the object. The detection data integration unit outputs obstacle detection data.

12 Claims, 4 Drawing Sheets

APPARATUS AND METHOD FOR DETECTING OBSTACLE ADAPTIVELY TO VEHICLE SPEED

CROSS REFERENCE TO RELATED APPLICATION

This application claims the benefit of Korean Patent Application No. 10-2013-0011459, filed on Jan. 31, 2013, which is hereby incorporated by reference in its entirety into this application.

BACKGROUND OF THE INVENTION

1. Technical Field

The present invention relates generally to an apparatus and method for detecting an obstacle adaptively to vehicle speed, which are capable of detecting an obstacle in front of a vehicle to assist in safe driving and, more particularly, to an apparatus and method for detecting an obstacle adaptively to vehicle speed, which can adjust obstacle detection response speed by varying a detection region within which an obstacle is detected in front of a vehicle based on the speed of the vehicle, and can also integrate detection data generated by a plurality of heterogeneous sensors by providing a synchronization signal to the plurality of sensors that generate detection data on obstacles.

2. Description of the Related Art

It is expected that vehicles will evolve into intelligent vehicles that can autonomously travel to their destinations. As active research related to future vehicles is carried out recently, companies all over the world, including Google of the U.S., are developing autonomous driving vehicles and related technologies, or are carrying out the research and development of the commercialization of autonomous driving vehicles. Furthermore, vehicles are evolving into intelligent vehicles that are equipped with safety functions, such as driver drowsiness prevention, front collision prevention and intersection collision prevention, and/or convenience functions, such as autonomous expressway driving and automatic parking, because the vehicles can enhance drivers' recognition capability using information received from adjacent vehicles and external infrastructures as well as the sensors of the vehicles.

Recognition technology, that is, one of the component technologies for implementing intelligent vehicles, is an IT technology converged into vehicles, and can be used to prevent drowsy driving by monitoring the states of drivers, and to monitor the malfunction or failure of main components of the vehicles or to recognize the driving state of the vehicles. Using this recognition technology, intelligent vehicles autonomously recognize lanes and traffic lamps by recognizing obstacles in front of and behind the vehicle or an obstacle within a blind spot where the field of view of a driver is not ensured, thereby enabling assistance to driving and autonomous driving.

A Radio Detection And Ranging (RADAR), a Light Detection And Ranging (LiDAR), an ultrasonic sensor, and a camera sensor are used as obstacle detection sensors for supporting assistance to driving for the safe driving of a vehicle and autonomous driving. Furthermore, since a single type of sensors are unable to deal with all types of driving environments, various types of sensors are being used or a technology into which heterogeneous sensors have converged is being used. A laser scanner, that is, a LiDAR, includes 2-D, 3-D and 4 layer types of scanners, and the camera includes an infrared camera, a stereo camera, and a wide-angle lens camera.

In the convergence of heterogeneous sensors, it is difficult to temporally synchronize the sensors due to the differences in the data processing and output results of the sensors, and a lot of expensive equipment should be used due to various types of driving environments. Furthermore, high-speed data processing speed is required to precisely detect an obstacle, and sensing response speed, that is, obstacle detection response speed, can be considered to be directly related to the driving safety of a vehicle.

U.S. Patent Application Publication No. 2010/0328644 entitled "Object Detection and Tracking System" discloses an object detection system including an imaging device, an image processor, and a LiDAR device in order to detect an obstacle in front of a vehicle. In U.S. Patent Application Publication No. 2010/0328644, the imaging device obtains data regarding images of scenes outside a vehicle, and the image processor processes the image data so that an object of interest within the angle of the field of view of the imaging device can be detected. Meanwhile, the LiDAR device has the angle of the field of view in order to indicate the direction of a detected object while operating in conjunction with the image data processing of the image processor, and performs a task for measuring the distance between the vehicle and the detected object.

However, in conventional technologies for detecting an object around a vehicle, such as the technology disclosed in U.S. Patent Application Publication No. 2010/0328644, a scheme for improving obstacle detection response speed or a scheme for providing temporal synchronization in order to integrate the detection data of heterogeneous sensors is not taken into consideration at all.

SUMMARY OF THE INVENTION

Accordingly, the present invention has been made keeping in mind the above problems occurring in the prior art, and an object of the present invention is to provide a technique that is capable of increasing obstacle detection response speed by decreasing a detection region in which a sensor can detect an obstacle in front of a vehicle in response to an increase in the speed of the vehicle based on the speed of the vehicle.

Another object of the present invention is to provide an obstacle detection system that generates obstacle detection data obtained by integrating the detection data of heterogeneous sensors using a PPS signal of a Global Positioning System (GPS) module as a synchronization signal, and outputs information about a delay time that occurs during the processing of obstacle detection of each of the sensors, thereby facilitating the temporal synchronization between the heterogeneous sensors and operation in conjunction with another system.

In accordance with an aspect of the present invention, there is provided an apparatus for detecting an obstacle adaptively to vehicle speed, including a control unit configured to receive information about the speed of a vehicle and a Pulse Per Second (PPS) signal from a Global Positioning System (GPS) module; a speed-adaptive camera sensor configured to adjust the range of a detection region on an image of an area around the vehicle captured by a camera based on the information about the speed of the vehicle, and to generate first detection data on the object within the range of the detection region using the PPS signal as a synchronization signal; a speed-adaptive laser scanner sensor configured to adjust the range of the angle of the field of view of a laser scanner for detecting an object around the vehicle based on the information about the speed of the vehicle, and to generate second detection data on the object within the range of the angle of the field of view using the PPS signal as a synchronization signal; and a detection data integration unit configured to output obstacle detection data obtained by integrating the first detection data and the second detection data.

The speed-adaptive camera sensor may increase sensing response speed by decreasing the range of the detection region in response to an increase in the speed of the vehicle.

The speed-adaptive camera sensor may generate a first PPS delay signal indicative of a sensing time of the first detection data delayed compared to the PPS signal.

The speed-adaptive laser scanner sensor may increase the sensing response speed by decreasing the left and right range of the angle of the field of view in response to the increase in the speed of the vehicle.

The speed-adaptive laser scanner sensor may generate a second PPS delay signal indicative of a sensing time of the second detection data delayed compared to the PPS signal.

The detection data integration unit may generate the obstacle detection data by integrating the first detection data and the second detection data based on the first PPS delay signal and the second PPS delay signal.

The speed-adaptive laser scanner sensor may increase the laser light radiation angle of the laser scanner upwards in response to the increase in the speed of the vehicle.

In accordance with another aspect of the present invention, there is provided a method of detecting an obstacle adaptively to vehicle speed, including receiving, by a control unit, information about a speed of a vehicle and a Pulse Per Second (PPS) signal from a GPS module; adjusting, by a speed-adaptive camera sensor, a range of a detection region on an image of an area around the vehicle captured by a camera based on the information about the speed of the vehicle; generating, by the speed-adaptive camera sensor, first detection data on the object within the range of the detection region using the PPS signal as a synchronization signal; adjusting, by a speed-adaptive laser scanner sensor, a range of an angle of a field of view of a laser scanner for detecting an object around the vehicle based on the information about the speed of the vehicle; generating, by the speed-adaptive laser scanner sensor, second detection data on the object within the angle of the field of view using the PPS signal as a synchronization signal; and outputting, by a detection data integration unit, obstacle detection data obtained by integrating the first detection data and the second detection data.

Adjusting the range of the detection region may include decreasing the range of the detection region in response to an increase in the speed of the vehicle.

Generating the first detection data on the object within the range of the detection region may include generating a first PPS delay signal indicative of a sensing time of the first detection data delayed compared to the PPS signal.

Adjusting the range of the angle of the field of view of the laser scanner may include decreasing the left and right range of the field of view in response to the increase in the speed of the vehicle.

Generating the second detection data on the object within the range of the angle of the field of view comprises generating a second PPS delay signal indicative of a sensing time of the second detection data delayed compared to the PPS signal.

Outputting the obstacle detection data may include generating the obstacle detection data by integrating the first detection data and the second detection data based on the first PPS delay signal and the second PPS delay signal.

Adjusting the range of the angle of the field of view of the laser scanner may include increasing the laser light radiation angle of the laser scanner upwards in response to the increase in the speed of the vehicle.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
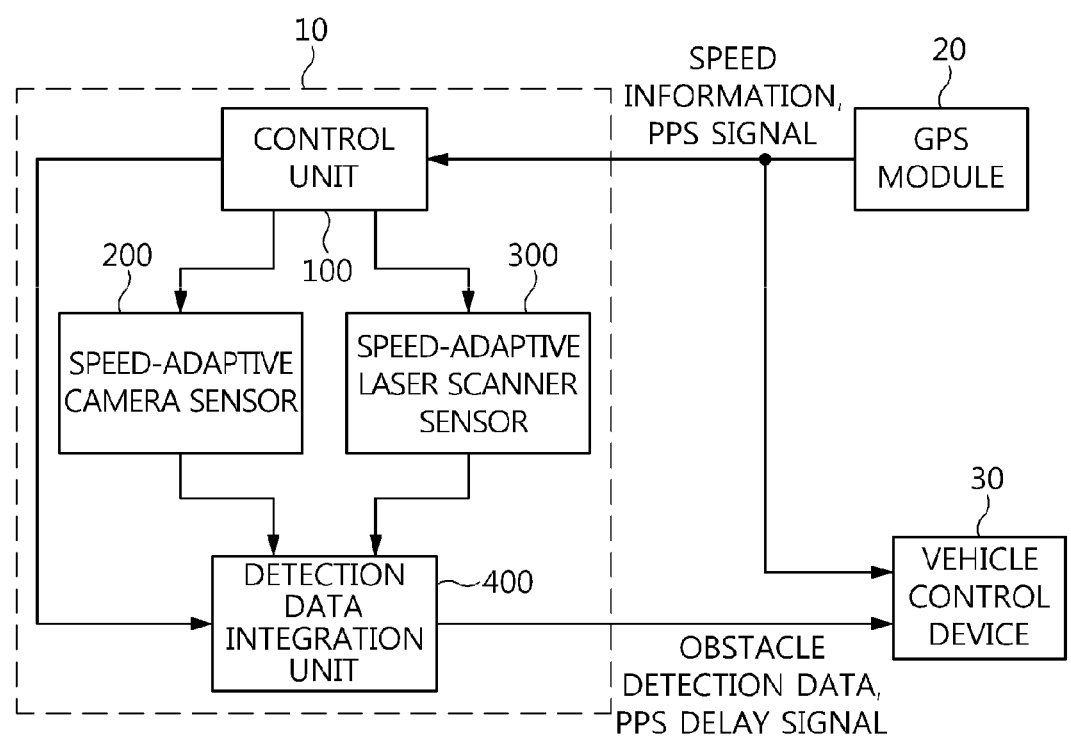
FIG. 1 is a block diagram illustrating the configuration of an apparatus for detecting an obstacle adaptively to vehicle speed according to the present invention.

An apparatus and method for detecting an obstacle adaptively to vehicle speed according to the present invention will be described with reference to the accompanying drawings. Prior to the following detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present invention. Accordingly, it should be appreciated that there may be various equivalents and modifications that can replace the examples at the time at which the present application is filed.

The configuration and operation of an apparatus for detecting an obstacle adaptively to vehicle speed according to the present invention will be described with reference to FIGS. 1 to 4.

FIG. 1 is a block diagram illustrating the configuration of an apparatus for detecting an obstacle adaptively to vehicle speed according to the present invention.

Referring to FIG. 1, the apparatus for detecting an obstacle adaptively to vehicle speed 10 according to the present invention includes a control unit 100, a speed-adaptive camera sensor 200, a speed-adaptive laser scanner sensor 300, and a detection data integration unit 400.

The control unit 100 receives information about the current speed of a vehicle and a Pulse Per Second (PPS) signal from an external GPS module 20 in real time. Furthermore, the control unit 100 outputs control signals used to adjust a detection range, that is, a target region within which an object around a vehicle is detected, based on the information about the current speed of the vehicle received from the GPS module 20, to the speed-adaptive camera sensor 200 and the speed-adaptive laser scanner sensor 300. In this case, the control unit 100 may be configured to provide the information about the current speed of the vehicle directly to the speed-adaptive camera sensor 200 and the speed-adaptive laser scanner sensor 300 instead of outputting the control signals used to adjust the detection range to the speed-adaptive camera sensor 200 and the speed-adaptive laser scanner sensor 300.

Furthermore, the control unit 100 provides the speed-adaptive camera sensor 200 and the speed-adaptive laser scanner sensor 300 with the PPS signal received from the GPS module 20, thereby enabling the adaptive camera sensor 200 and the speed-adaptive laser scanner sensor 300 to generate detection data using the same PPS signal as a synchronization signal. The configuration and operation of the control unit 100 will be described in greater detail later with reference to FIG. 4.

The speed-adaptive camera sensor 200 adjusts the range of a detection region on an image of an area around a vehicle based on information about the current speed of the vehicle collected by the control unit 100 in real time, and generates detection data on an object detected within the adjusted range of the detection region. In this case, the speed-adaptive camera sensor 200 may obtain an image of a specific region in front of the vehicle in the direction of the vehicle via a camera installed on the front of the vehicle, may perform clearing and noise removal processing on the obtained image, and may analyze the processed image, thereby generating detection data for the object within the range of the detection region.

The speed-adaptive camera sensor 200 adjusts the range of the detection region within which an object is detected in response to a control signal that is generated by the control unit 100 based on information about the current speed of the vehicle. That is, the speed-adaptive camera sensor 200 adjusts the range of the detection region within which an obstacle is detected based on the current speed of the vehicle, thereby adjusting sensing response speed (i.e., obstacle detection response speed) at which an image of a detection region is processed and analyzed in order to detect whether an obstacle is present.

Figure 2:
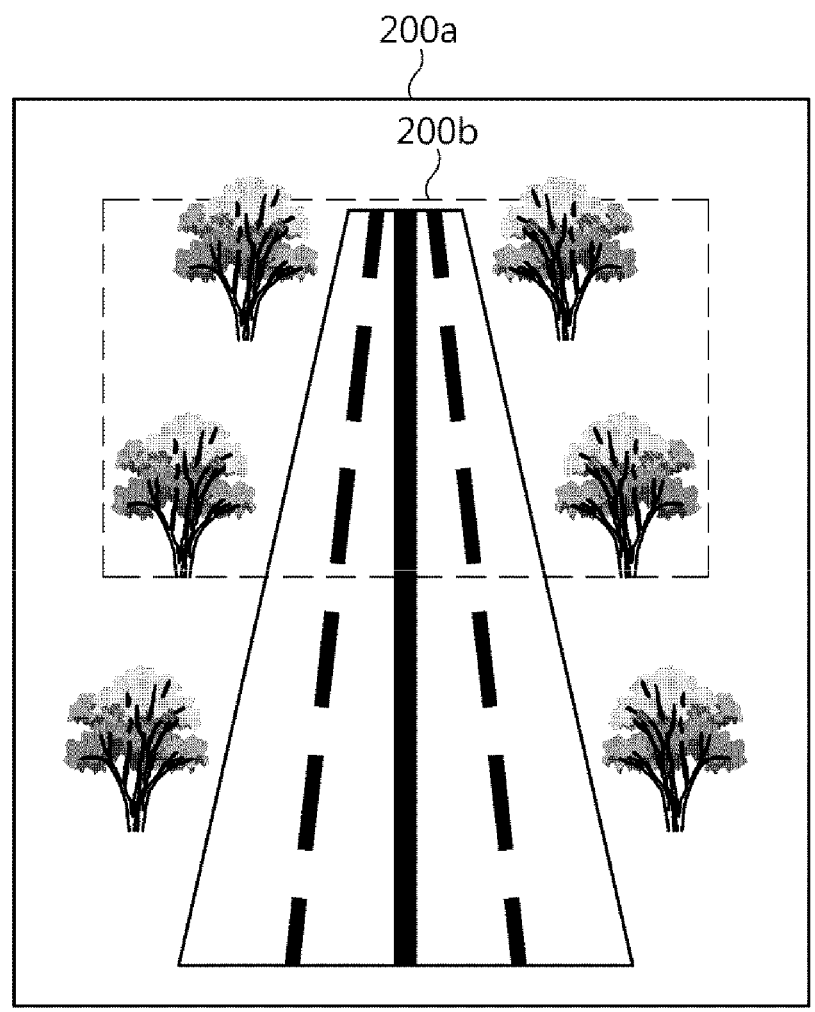
FIG. 2 is a diagram illustrating an operation of a speed-adaptive camera sensor of FIG. 1 varying the range of a detection region in which an obstacle is detected depending on speed of a vehicle.

If the photographing region of a camera for capturing an image around the vehicle corresponds to a photographing region 200*a*, such as that shown in FIG. 2, the speed-adaptive camera sensor 200 sets the entire photographing region 200*a* as a detection region within which an obstacle is detected if the current speed of the vehicle is low, and detects an object around the vehicle in the set detection region. In contrast, if the current speed of the vehicle is high, the speed-adaptive camera sensor 200 sets a region 200*b* narrower than the entire photographing region 200*a* as a detection region within which an obstacle is detected, and then detects an object around the vehicle within the narrower detection region, thereby increasing sensing response speed at which a detected image is processed and analyzed. The speed-adaptive camera sensor 200 may adjust the range of a detection region on an image captured by a camera based on the speed of the vehicle in various ways.

As an example, the speed-adaptive camera sensor 200 may be configured to detect an object around the vehicle in the entire photographing region 200*a* if the current speed of the vehicle collected in real time is equal to or lower than a predetermined reference speed, and to detect an object around the vehicle in the detection region 200*b* narrower than the entire photographing region 200*a* if the current speed of the vehicle is higher than the predetermined reference speed.

As another example, the speed-adaptive camera sensor 200 may be configured to increase the range of a detection region if the current speed of the vehicle is equal to or lower than a previously collected speed of the vehicle and to decrease the range of the detection region if the current speed of the vehicle is higher than the previously collected speed of the vehicle, thereby detecting an object around a vehicle within an adjusted detection region.

Furthermore, the speed-adaptive camera sensor 200 generates detection data on an object detected within the detection region adjusted based on the speed of the vehicle by processing and analyzing an image corresponding to the detection region, and then sends the generated detection data to the detection data integration unit 400. In this case, the speed-adaptive camera sensor 200 may generate the detection data on the object within the range of the detection region at every specific time using the PPS signal received from the control unit 100 as a synchronization signal. Furthermore, the speed-adaptive camera sensor 200 may generate a PPS delay signal (hereinafter referred to as the "first PPS delay signal"), indicative of the delay of the generation of the detection data with respect to the PPS signal, while generating detection data on the detected object at every specific time, and may send the first PPS delay signal to the detection data integration unit 400.

The speed-adaptive laser scanner sensor 300 adjusts the range of the angle of the field of view of a laser scanner for detecting an object around the vehicle based on information about the current speed of the vehicle adjusted by the control unit 100 in real time, and generates detection data on the object within the adjusted angle of the field of view. The laser scanner that is used in the present invention is a laser scanner based on the laser radar principle based on which an object within the angle of the field of view is detected by detecting a signal when a single emitted laser beam is reflected from the surface of the object and then returns.

The speed-adaptive laser scanner sensor 300 detects an object within the angle of the field of view of the laser scanner in front of the vehicle in the direction of the vehicle through the laser scanner installed on the front of the vehicle, and generates detection data on the detected object. In this case, the speed-adaptive laser scanner sensor 300 receives the control signal, generated based on information about the current speed of the vehicle, from the control unit 100, and adjusts the range of the angle of the field of view of the laser scanner for detecting an object in response to the received control signal.

The speed-adaptive laser scanner sensor 300 may adjust the angle of the field of view of the laser scanner for detecting an obstacle based on the current speed of the vehicle, and thus the sensing response speed (i.e., obstacle detection response speed) at which a signal emitted within the angle of the field of view and then reflected from a surface of the object in order to detect whether an obstacle is present is processed and analyzed may be adjusted. That is, if the speed of the vehicle is low, the speed-adaptive laser scanner sensor 300 adjusts the laser scanner so that the laser scanner detects an object in front of the vehicle at the narrow angle of the field of view. Accordingly, the amount of data for processing a reflected signal is decreased, and thus sensing response speed is increased. If the speed of the vehicle is low, the speed-adaptive laser scanner sensor 300 adjusts the laser scanner so that the laser scanner has the wide angle of the field of view because there is no problem if the sensing response speed is lower than that at the time at which the speed of the vehicle is high.

Figure 3:
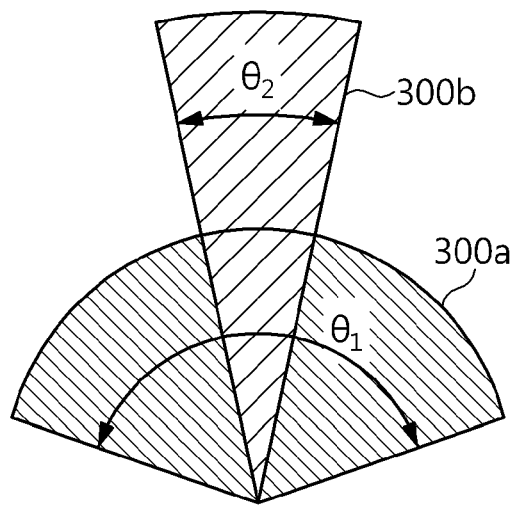
FIG. 3 is a diagram illustrating an operation of a speed-adaptive laser scanner sensor of FIG. 1 varying the angle of the field of view of a laser scanner for detecting an obstacle depending on speed of a vehicle.

For example, assuming that the right and left angle of the field of view of a laser scanner for detecting an object in front of a vehicle basically corresponds to a range 300*a* having a view field angle of $\theta_1$, such as that shown in FIG. 3, if the current speed of the vehicle is low, the speed-adaptive laser scanner sensor 300 sets the angle of the field of view of the laser scanner as the range 300*a* having a view field angle of $\theta_1$ and detects an object around the vehicle in the range $300a$ having a view field angle of $\theta_1$.

In contrast, if the current speed of the vehicle is high, the speed-adaptive laser scanner sensor 300 adjusts the range of the angle of the field of view of the laser scanner to a range $300b$ having a view field angle of $\theta_2$ that is narrower than the range $300a$ having a view field angle of $\theta_1$ and detects an object around the vehicle in the range $300b$ having a decreased view field angle of $\theta_2$, thereby increasing sensing response speed at a reflected signal is processed. The speed-adaptive laser scanner sensor 300 may adjust the angle of the field of view of a laser scanner based on the speed of a vehicle in various ways.

As an example, the speed-adaptive laser scanner sensor 300 may be configured to detect an object in front of a vehicle in the range $300a$ having a view field angle of $\theta_1$ if the current speed of the vehicle collected in real time is equal to or lower than a predetermined reference speed, and to detect an object in front of the vehicle in the range $300b$ having a view field angle of $\theta_2$ narrower than the range $300a$ having a view field angle of $\theta_1$ if the current speed of the vehicle collected in real time is higher than the predetermined reference speed.

As another example, the speed-adaptive laser scanner sensor 300 may detect an object within the adjusted angle of the field of view of a laser scanner by increasing the angle of the field of view of the laser scanner if the current speed of a vehicle is lower than the previously collected speed of the vehicle and decreasing the angle of the field of view of the laser scanner if the current speed of the vehicle is higher than the previously collected speed of the vehicle.

Meanwhile, the speed-adaptive laser scanner sensor 300 may be configured to detect an object by increasing the laser light radiation angle of the laser scanner upwards based on an increase in the collected speed of the vehicle. That is, the speed-adaptive laser scanner sensor 300 may adjust the laser light radiation angle of the speed-adaptive laser scanner sensor upwards or downwards based on the collected speed of the vehicle.

For example, the speed-adaptive laser scanner sensor 300 may adjust the laser light radiation angle of the laser scanner to a position below a horizontal position if the speed of the vehicle is low, and may adjust the laser light radiation angle of the laser scanner to a horizontal position in order to detect an obstacle over a long distance if the speed of the vehicle is high. If the laser light radiation angle of the laser scanner is adjusted to the position below the horizontal position, sensing response speed can be increased because the number of detected obstacles is smaller than that at the time at which the laser light radiation angle is horizontal.

The speed-adaptive laser scanner sensor 300 may adjust the laser light radiation angle of a laser scanner based on the speed of a vehicle in a manner similar to the manner of adjusting the angle of the field of view of the laser scanner. That is, if the current speed of the vehicle collected in real time is equal to or lower than a predetermined reference speed, the speed-adaptive laser scanner sensor 300 may be configured to adjust the laser light radiation angle of the laser scanner to a position below a horizontal position and to detect an object in front of the vehicle. If the current speed of the vehicle is higher than predetermined reference speed, the speed-adaptive laser scanner sensor 300 may be configured to maintain the laser light radiation angle of the laser scanner at a horizontal position and to detect an object in front of the vehicle.

Furthermore, if the current speed of the vehicle is lower than the previously collected speed of the vehicle, the speed-adaptive laser scanner sensor 300 may be configured to decrease the laser light radiation angle of the laser scanner and to detect an object. If the current speed of the vehicle is higher than the previously collected speed of the vehicle, the speed-adaptive laser scanner sensor 300 may be configured to increase the laser light radiation angle of the laser scanner and to detect an object.

Furthermore, the speed-adaptive laser scanner sensor 300 generates detection data on a detected object within the angle of the field of view by processing and analyzing a signal reflected within a range of the angle of the field of view adjusted based on the speed of a vehicle, and sends the detection data to the detection data integration unit 400. In this case, the speed-adaptive laser scanner sensor 300 can generate the detection data on the detected object within the range of the angle of the field of view at every specific time in response to the synchronization signal received from the control unit 100.

Furthermore, the speed-adaptive laser scanner sensor 300 may generate a PPS delay signal indicative of the delay of the generation of the detection data with respect to the PPS signal (hereinafter referred to as the "second PPS delay signal") while generating the detection data on the detected object at every specific time, and sends the second PPS delay signal to the detection data integration unit 400.

The detection data integration unit 400 receives the PPS signal from the control unit 100, and finally generates obstacle detection data by integrating the detection data received from the speed-adaptive camera sensor 200 (hereinafter referred to as "first detection data") and the detection data received from the speed-adaptive laser scanner sensor 300 (hereinafter referred to as "second detection data") in response to the received PPS signal. In this case, the detection data integration unit 400 may generate obstacle detection data by integrating a plurality of pieces of detection data on detected objects around a vehicle at the same time with respect to the first detection data and the second detection data using the PPS delay signals that are received from the speed-adaptive camera sensor 200 and the speed-adaptive laser scanner sensor 300.

The detection data integration unit 400 may output the integrated obstacle detection data and the PPS delay signals (i.e., the first PPS delay signal and the second PPS delay signal) to the vehicle control device 30 or a driver warning device. Accordingly, the vehicle control device 30 or the driver warning device may adjust the vehicle or provide warning service to a driver using the obstacle detection data and the PPS delay signals received from the detection data integration unit 400 and information about speed and the PPS signal received from the GPS module 20.

Figure 4:
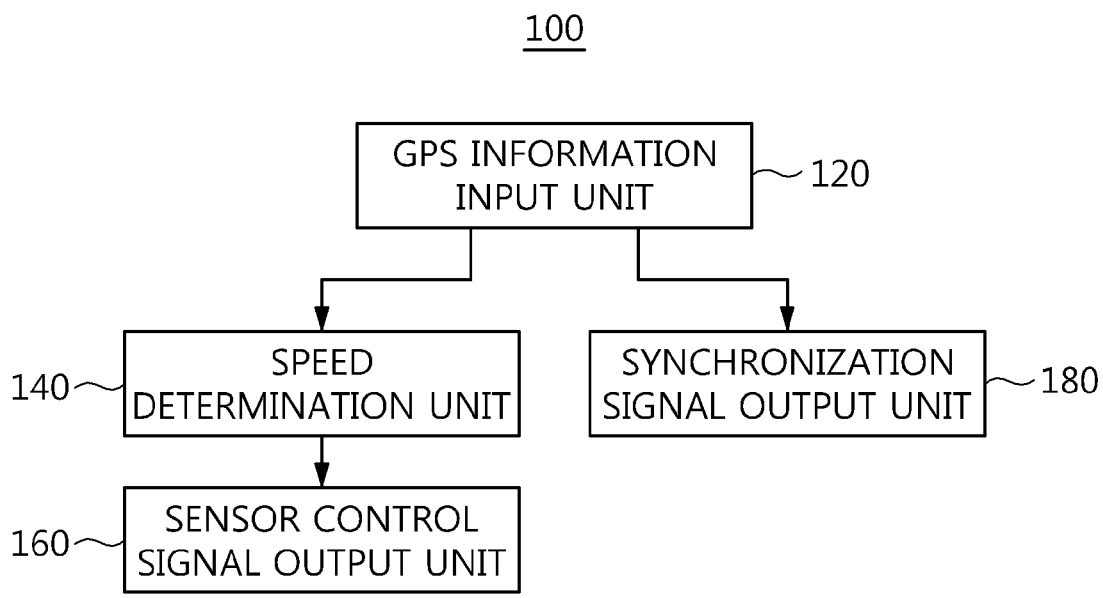
FIG. 4 is a block diagram illustrating the configuration of a control unit shown in FIG. 1.

FIG. 4 is a block diagram illustrating the configuration of the control unit 100 shown in FIG. 1.

Referring to FIG. 4, the control unit 100 includes a GPS information input unit 120, a speed determination unit 140, a sensor control signal output unit 160, and a synchronization signal output unit 180.

The GPS information input unit 120 receives information about the speed of a vehicle and a PPS signal from the GPS module 20 in real time. The GPS information input unit 120 sends the information about the speed of the vehicle, received in real time, to the speed determination unit 140, and also sends the PPS signal to the synchronization signal output unit 180.

The speed determination unit 140 generates information, based on which a control signal used to control the speed-adaptive camera sensor 200 and the speed-adaptive laser scanner sensor 300 is generated, using the information about the speed of the vehicle received from the GPS information input unit 120 in real time, and provides the generated information to the control signal output unit 160. In this case, the speed determination unit 140 may determine whether the current speed of the vehicle is equal to or higher than a predetermined reference speed based on the information about the speed of the vehicle received from the GPS information input unit 120 in real time, and may provide the results of the determination to the sensor control signal output unit 160.

Furthermore, if, as a result of the determination, it is determined that the current speed of the vehicle is equal to or higher than the predetermined reference speed, the speed determination unit 140 may compare the current speed of the vehicle with the previously collected speed of the vehicle, and provides the sensor control signal output unit 160 with information about the difference between the current speed of the vehicle and the previously collected speed of the vehicle together with a result of the comparison.

The sensor control signal output unit 160 generates a control signal used to adjust the detection region of the speed-adaptive camera sensor 200 and a control signal used to adjust the angle of the field of view of the range of the speed-adaptive laser scanner sensor 300 based on the information received from the speed determination unit 140, and outputs the generated control signals to the speed-adaptive camera sensor 200 and the speed-adaptive laser scanner sensor 300.

More particularly, if the current speed of the vehicle is equal to or lower than the predetermined reference speed based on the information received from the speed determination unit 140, the sensor control signal output unit 160 outputs a control signal, used to enable an object in front of the vehicle to be detected in the entire photographing region of the camera 200a, to the speed-adaptive camera sensor 200.

In contrast, if the current speed of the vehicle is equal to or higher than the predetermined reference speed, the sensor control signal output unit 160 outputs a control signal, used to enable an object in front of the vehicle to be detected in the detection region 200b narrower than the photographing region of the camera 200a, to the speed-adaptive camera sensor 200. In this case, the sensor control signal output unit 160 may output a control signal, used to increase or decrease the range of the detection region by the difference based on the information about the difference between the current speed of the vehicle and the previously collected speed of the vehicle, received from the speed determination unit 140, to the speed-adaptive camera sensor 200.

Meanwhile, if the current speed of the vehicle is equal to or lower than the predetermined reference speed based on the information received from the speed determination unit 140, the sensor control signal output unit 160 outputs a control signal, used to set the angle of the field of view of the laser scanner as the range 300a of view field angle $\theta_1$ and to enable an object around the vehicle to be detected in the range 300a of the view field angle $\theta_1$, to the speed-adaptive laser scanner sensor 300.

In contrast, if the current speed of the vehicle is equal to or higher than the predetermined reference speed, the sensor control signal output unit 160 outputs a control signal, used to set the angle of the field of view of the laser scanner as the range 300b of view field angle $\theta_2$ that is more decreased than the range 300a of the view field angle $\theta_1$ and to enable an object around the vehicle to be detected in the decreased range 300b of the view field angle $\theta_2$, to the speed-adaptive laser scanner sensor 300. In this case, the sensor control signal output unit 160 may output a control signal, used to increase or decrease the angle of the field of view by the difference based on the information about the difference between the current speed of the vehicle and the previously collected speed of the vehicle received from the speed determination unit 140, to the speed-adaptive camera sensor 200.

Furthermore, the sensor control signal output unit 160 may output a control signal, used to enable the laser light radiation angle of the laser scanner to be adjusted based on the current speed of the vehicle, to the speed-adaptive laser scanner sensor 300.

The synchronization signal output unit 180 outputs the PPS signal, received from the GPS module 20 in real time, to the speed-adaptive camera sensor 200 and the speed-adaptive laser scanner sensor 300 as a synchronization signal. Accordingly, the speed-adaptive camera sensor 200 and the speed-adaptive laser scanner sensor 300 generate detection data regarding objects around the vehicle (i.e., the first detection data and the second detection data) using the PPS signal as the synchronization signal.

A method of detecting an obstacle adaptively to vehicle speed according to the present invention will be described below with reference to FIG. 5. Descriptions that are identical to those of the operation of the apparatus for detecting an obstacle adaptively to vehicle speed according to the present invention given with reference to FIGS. 1 to 4 will be omitted.

Figure 5:
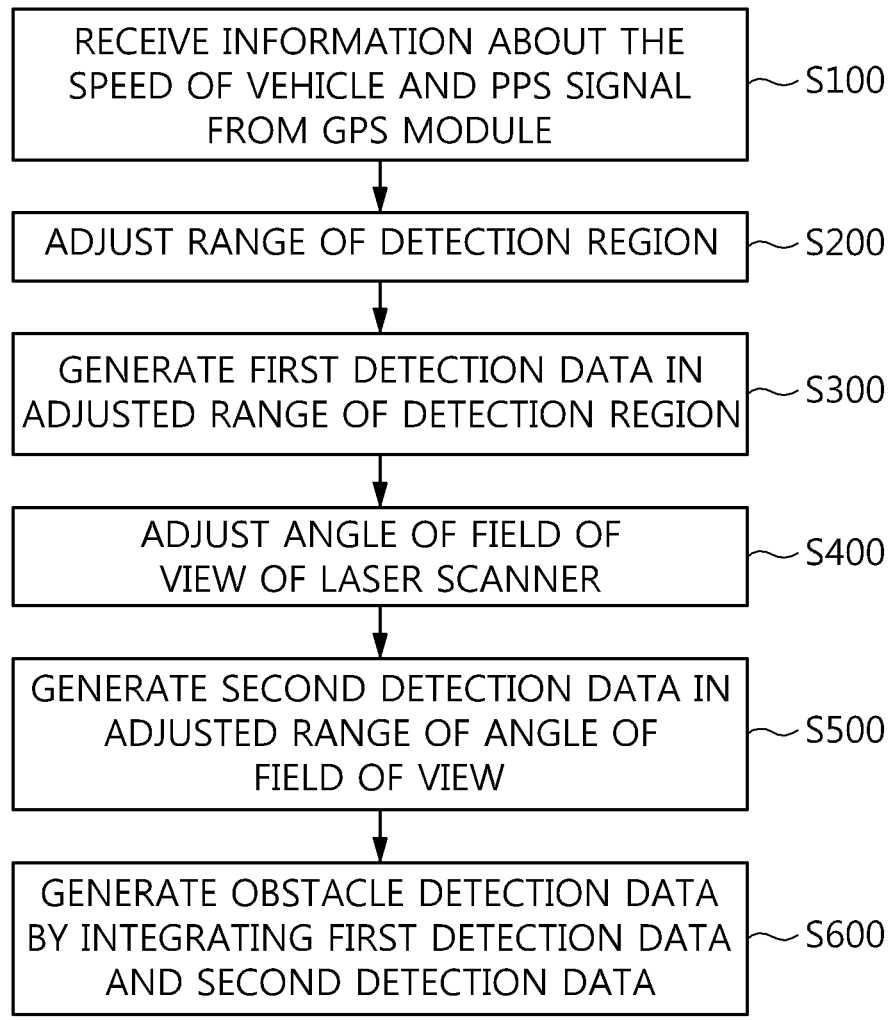
FIG. 5 is a flowchart illustrating a method of detecting an obstacle adaptively to vehicle speed according to the present invention.

FIG. 5 is a flowchart illustrating a method of detecting an obstacle adaptively to vehicle speed according to the present invention.

Referring to FIG. 5, in the method of detecting an obstacle adaptively to vehicle speed according to the present invention, the control unit 100 receives information about the speed of a vehicle and a PPS signal from the GPS module 20 in real time at step S100. At step S100, the control unit generates control signals used to control a detection range, that is, a target region within which an object around the vehicle is detected, based on the information about the speed of the vehicle received from the GPS module in real time, and outputs the control signals to the speed-adaptive camera sensor 200 and the speed-adaptive laser scanner sensor 300. In this case, the control unit 100 may transfer the PPS signal, received from the GPS module 20, to the speed-adaptive camera sensor 200 and the speed-adaptive laser scanner sensor 300 as a synchronization signal.

Furthermore, the speed-adaptive camera sensor 200 adjusts the range of the detection region on an image of an area around the vehicle, captured by a camera, in response to the control signal generated from the control unit 100 based on the information about the speed of the vehicle at step S200. At step S200, the speed-adaptive camera sensor 200 decreases the range of the detection region on the image of the region around the vehicle in response to an increase in the speed of the vehicle.

Thereafter, the speed-adaptive camera sensor 200 detects an object within the range of the detection region, adjusted at step S200, using the PPS signal received from the control unit 100 as the synchronization signal and generates first detection data that is the result of the detection at step S300. Furthermore, at step S300, the speed-adaptive camera sensor 200 generates a first PPS delay signal indicative of the delay of first detection data with respect to the PPS signal together with the first detection data. At step S300, the speed-adaptive camera sensor 200 sends the first detection data and the first PPS delay signal to the detection data integration unit 400.

Meanwhile, the speed-adaptive laser scanner sensor 300 adjusts the range of the angle of the field of view of a laser scanner for detecting an object around the vehicle in response to the control signal generated from the control unit 100 based on the information about the speed of the vehicle at step S400. At step S400, the speed-adaptive laser scanner sensor 400 decreases the right and left angle of the field of view of the laser scanner in response to an increased in speed of the vehicle. In this case, the speed-adaptive laser scanner sensor 300 may detect an object over a long distance by increasing the laser light radiation angle of the laser scanner upwards in response to an increase in the speed of the vehicle.

Thereafter, the speed-adaptive laser scanner sensor 300 detects an object within the angle of the field of view adjusted at step S400 using the PPS signal as a synchronization signal and generates second detection data, that is, the result of the detection at step S500. Furthermore, at step S500, the speed-adaptive laser scanner sensor 300 generates a second PPS delay signal, indicative of the delay of generation of the second detection data with respect to the PPS signal, together with the second detection data. The speed-adaptive laser scanner sensor 300 sends the second detection data and the second PPS delay signal generated at step S500 to the detection data integration unit 400.

Although the flowchart of FIG. 5 illustrates that the speed-adaptive camera sensor 200 detects an object around the vehicle at steps S200 and S300 and the speed-adaptive laser scanner sensor 300 then detects an object around the vehicle at steps S400 and S500, steps S200 and S300 and steps S400 and S500 may be performed at the same time.

Finally, the sensor data integration unit 400 generates obstacle detection data by integrating the first detection data received from the speed-adaptive camera sensor 200 and the second detection data received from the speed-adaptive laser scanner sensor 300 and then sends the obstacle detection data to the vehicle control device 30 or a driver warning device at step S600. In this case, the detection data integration unit 400 may generate the obstacle detection data by integrating detection data on the detected object around the vehicle simultaneously with the first detection data and the second detection data using the first PPS delay signal and the second PPS delay signal received from the speed-adaptive camera sensor 200 and the speed-adaptive laser scanner sensor 300.

Meanwhile, steps S100 to S600 may be repeatedly performed until the driving of the vehicle stops.

As described above, according to the present invention, upon detecting an obstacle in front of a vehicle to assist in safe driving, the range of a detection region within which the speed-adaptive camera sensor detects an obstacle and the left and right range of the angle of the field of view of the speed-adaptive laser scanner sensor are varied based on the speed of the vehicle based on information about the speed of the vehicle obtained by the GPS module. Accordingly, the present invention is advantageous in that obstacle detection response speed directly related to safe driving can be adjusted.

Furthermore, according to the present invention, when a vehicle travels at high speed, the recognition region of a sensor for detecting an obstacle is decreased compared to that in the case in which the vehicle travels at low speed. Accordingly, the present invention is advantageous in that the amount of data required to detect an obstacle when a vehicle travels at high speed can be decreased and thus obstacle detection response speed can be improved.

Furthermore, according to the present invention, if the right and left angle of the field of view of the speed-adaptive laser scanner sensor is decreased when a vehicle travels at high speed, the laser light radiation angle of the speed-adaptive laser scanner sensor is adjusted upwards. Accordingly, the present invention is advantageous in that an obstacle can be detected over a long distance when a vehicle travels at high speed as compared with the case in which the vehicle travels at low speed.

Furthermore, according to the present invention, obstacle detection data is generated by integrating detection data generated from heterogeneous sensors using a PPS signal obtained by the GPS module as a synchronization signal, and information about a delay time generated when each sensor detect an obstacle is output. Accordingly, the present invention is advantageous in that the obstacle detection system that is capable of temporally synchronizing heterogeneous sensors and easily operating in conjunction with another system can be provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for detecting an obstacle adaptively to vehicle speed, comprising:
 a Global Positioning System (GPS) configured to generate information about a speed of a vehicle and a Pulse Per Second (PPS) signal;
 a speed-adaptive camera sensor configured to adjust a range of a detection region on an image of an area around the vehicle captured by a camera based on the information about the speed of the vehicle, and to generate first detection data on the obstacle within the range of the detection region using the PPS signal as a synchronization signal;
 a speed-adaptive laser scanner sensor configured to adjust a range of an angle of a field of view of a laser scanner for detecting the obstacle around the vehicle based on the information about the speed of the vehicle, and to generate second detection data on the obstacle within the range of the angle of the field of view using the PPS signal as a synchronization signal; and
 a processor configured to:
  receive, by a control unit, the information about the speed of the vehicle and the PPS signal from the GPS;
  generate and output, by the detection data integration unit, obstacle detection data by integrating the first detection data and the second detection data based on a first PPS delay signal and a second PPS delay signal,
  wherein the obstacle detection data comprises integrating a plurality of pieces of detection data on detected objects around the vehicle at the same time with respect the first detection data and the second detection data.

2. The apparatus of claim 1, wherein the speed-adaptive camera sensor increases sensing response speed by decreasing the range of the detection region in response to an increase in the speed of the vehicle.

3. The apparatus of claim 2, wherein the speed-adaptive camera sensor generates the first PPS delay signal indicative of a sensing time of the first detection data delayed compared to the PPS signal.

4. The apparatus of claim 3, wherein the speed-adaptive laser scanner sensor increases the sensing response speed by decreasing a left and right range of the angle of the field of view in response to the increase in the speed of the vehicle.

5. The apparatus of claim 4, wherein the speed-adaptive laser scanner sensor generates the second PPS delay signal indicative of a sensing time of the second detection data delayed compared to the PPS signal.

6. The apparatus of claim 1, wherein the speed-adaptive laser scanner sensor increases a laser light radiation angle of the laser scanner upwards in response to an increase in the speed of the vehicle.

7. A method of detecting an obstacle adaptively to vehicle speed, comprising:
  receiving, by a processor, information about a speed of a vehicle and a Pulse Per Second (PPS) signal from a Global Positioning System (GPS), wherein the GPS generates the information about the speed of the vehicle and the PPS signal;
  adjusting, by a speed-adaptive camera sensor, a range of a detection region on an image of an area around the vehicle captured by a camera based on the information about the speed of the vehicle;
  generating, by the speed-adaptive camera sensor, first detection data on the obstacle within the range of the detection region using the PPS signal as a synchronization signal;
  adjusting, by a speed-adaptive laser scanner sensor, a range of an angle of a field of view of a laser scanner for detecting the obstacle around the vehicle based on the information about the speed of the vehicle;
  generating, by the speed-adaptive laser scanner sensor, second detection data on the obstacle within the angle of the field of view using the PPS signal as a synchronization signal; and
  outputting, by the processor, obstacle detection data obtained by integrating the first detection data and the second detection data based on a first PPS delay signal and a second PPS delay signal,
  wherein the obstacle detection data comprises integrating a plurality of pieces of detection data on detected objects around the vehicle at the same time with respect the first detection data and the second detection data.

8. The method of claim 7, wherein adjusting the range of the detection region comprises decreasing the range of the detection region in response to an increase in the speed of the vehicle.

9. The method of claim 8, wherein generating the first detection data on the object within the range of the detection region comprises generating the first PPS delay signal indicative of a sensing time of the first detection data delayed compared to the PPS signal.

10. The method of claim 9, wherein adjusting the range of the angle of the field of view of the laser scanner comprises decreasing a left and right range of the field of view in response to the increase in the speed of the vehicle.

11. The method of claim 10, wherein generating the second detection data on the object within the angle of the field of view comprises generating the second PPS delay signal indicative of a sensing time of the second detection data delayed compared to the PPS signal.

12. The method of claim 7, wherein adjusting the range of the angle of the field of view of the laser scanner comprises increasing a laser light radiation angle of the laser scanner upwards in response to an increase in the speed of the vehicle.

* * * * *